Feb. 26, 1952    G. H. DE VRIES    2,587,293
SUGAR CRYSTALLIZING PROCESS
Filed Jan. 23, 1948
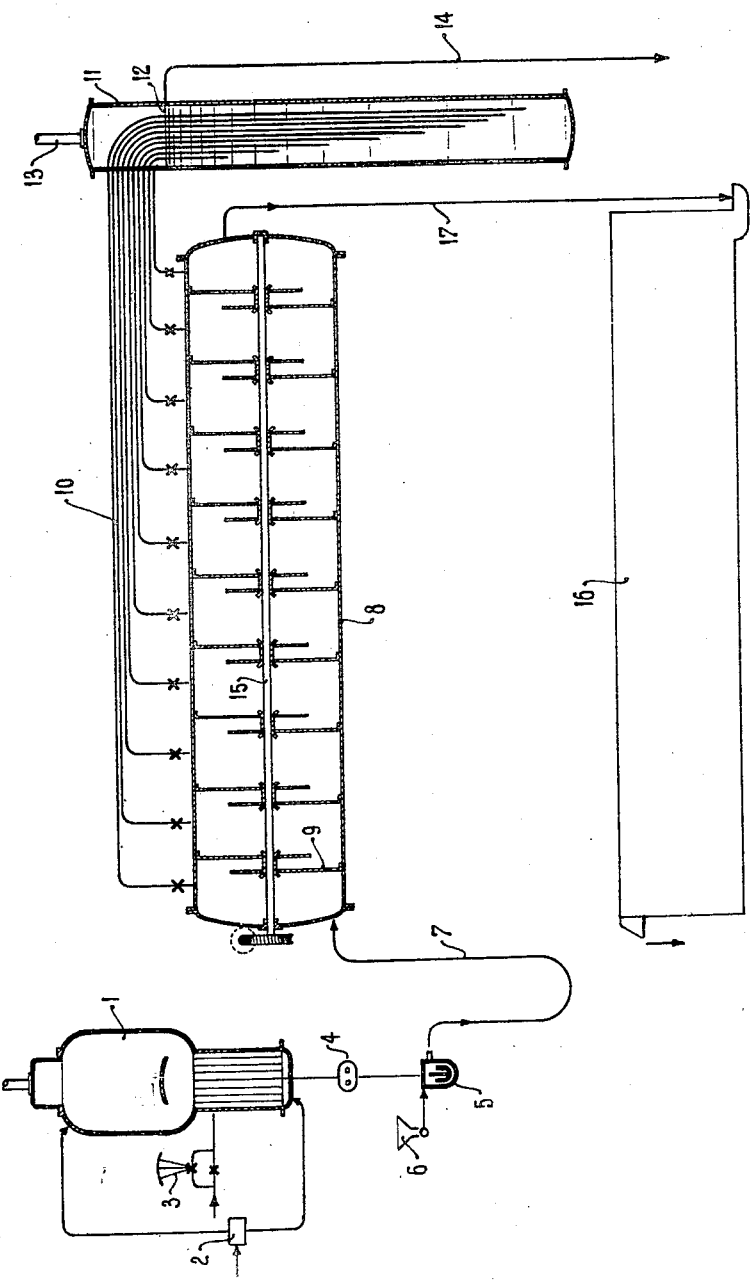
INVENTOR,
Gerbertus H. de Vries,
BY
ATTORNEY Patented Feb. 26, 1952

2,587,293

UNITED STATES PATENT OFFICE 2,587,293

SUGAR CRYSTALLIZING PROCESS

Gerbertus H. de Vries, Hilversum, Netherlands, assignor to Werkspoor N. V., Amsterdam, Netherlands, a company of the Netherlands Application January 23, 1948, Serial No. 3,943
In the Netherlands January 31, 1947

3 Claims. (Cl. 127—60)

This invention relates to a process and an apparatus for continuously crystallizing sugar solutions.

U. S. patent specification 2,263,704 describes a process for crystallizing sugar solutions, in which seed grains or crystals are added to the solution, whereafter the mass is subjected to a cooling treatment in order to have the crystals grow. In said process, water is employed as a cooling fluid which for instance is passed through cooling elements located in the receptacle through which the sugar solution flows. Said method of cooling, among other things, presents the drawback that local super-cooling can occur at the cooling surfaces and resulting in the formation of false grains in consequence of an excessively high degree of oversaturation.

The invention has for its object to improve said cooling operation in such a manner that the desired degree of oversaturation may accurately be controlled and maintained. To this end, according to the invention, the required cooling is obtained by passing the solution which is saturated at a high temperature and charged with seed crystals through a number of stages in which vacuo of such a value are maintained that the differences in vacuum between the succeeding stages increase towards the delivery end. The heat for the evaporation is withdrawn from the mass itself, whereby, in consequence of the increased vacuum differentials between the stages, the amounts of heat withdrawn per volume-unit from the mass increase towards the delivery end. Said rate of cooling is required for maintaining the degree of supersaturation at a most favourable value for securing a uniform growth of the crystals.

According to the invention, the desired vacuum-differentials between the succeeding stages may be obtained by connecting a pipe to each chamber or trough successively traversed by the mass, said pipe terminating below a water level in a receptacle communicating with a condenser and the difference in length of the immersed portions of the pipes for the succeeding chambers or troughs increasing toward the delivery end.

The drawing diagrammatically illustrates an example of said embodiment which will now be described.

The sugar solution to be treated flows through a float device 2 into a concentrator 1 in which the solution is concentrated under a constant pressure and a constant temperature. The heating steam is supplied through the intermediary of a regulating device 3 maintaining in the concentrator a constant temperature which may amount e. g. 100° C. The concentrated and still saturated solution, by means of toothed wheel pump 4, is conveyed to a mixing vessel 5, into which seed grain is supplied by means of a distributing device 6. The mass loaded with seed grain subsequently flows into a syphon pipe 7, the longer leg of which is connected to the first compartment of a crystallizing vessel 8. In said compartment prevails a pressure below atmospheric pressure so that the mass gradually ascends in said compartment in order to flow over the partition 9 into the next compartment and to succeedingly traverse all the compartments. As the pressure, at which the solution boils in the concentrator 1 is higher than the pressure prevailing in the first compartment of the vessel 8 the mass in said compartment will boil at lower temperature so that self-evaporation occurs in the compartment, in consequence whereof the temperature decreases and the concentration of the mother liquor slightly increases so that the crystals will grow. The vapour generated in the compartment is discharged through a conduit 10 which terminates in a vessel 11 at a certain depth below a water level 12 therein.

The vessel 11 at 13 is connected to a condenser (not shown) and provided with an overflow pipe 14. As the pressure prevailing in the compartment has to balance a water column corresponding to the immersed portion of pipe 10 said pressure will be equal to the pressure in the condenser increased by the pressure corresponding to the water column, apart from the losses due to the resistance in the pipe. The pipes of the succeeding compartments always extend a shorter distance below the water level whereby the vacuum in the compartments stepwise increases and thus the mass in the successive compartments evaporates at a continually decreasing temperature. By suitably determining the length of the immersed part of the pipes 10 the required increased vacuum differences between the compartments and thus the desired rate of cooling and growing of the crystals are obtained.

The vessel 8 is provided with a shaft 15 carrying stirring members (not shown) for obtaining some stirring action in order to prevent precipitation of the crystals.

As shown in the drawing all compartments are in communication with one another by overflow-partitions 9 and adjacent depending shaft support baffles or partitions 9' and from the last compartment the mass, through a fall pipe 17, flows into a cooler 16, in which the growth of the crystals is continued and the supersaturation of the mother liquor is practically wholly removed. The mass discharged from the crystallizing vessel 8 may, however, also be added as core grains to another sugar solution for obtaining a coarsegrained product. The plant should then be completed with a mixing tank and a crystallizing vessel which both should be of greater capacity. The crystallizing process is then carried out in two stages whereby it is possible to obtain a very large output.

What I claim is:

1. The process for crystallizing sugar solutions in a continuous operation by stepwise cooling the sugar solution saturated at a temperature of about 100° C. and charged with seed grains, said cooling being carried out by subjecting the mass to a stepwise increasing vacuum and decreasing temperature and evaporating it without supply of heat, the differences in vacuum between the succeeding steps increasing towards the delivery end of the process.

2. The process for crystallizing sugar solutions in a continuous operation consisting in saturating the solution at a constant temperature of 100° C. supplying seed grains to the flow of the solution while mixing the same, and syphoning said saturated solution mass loaded with seed grains through a series of successive overflow connected compartments at a minus pressure successively decreasing below atmospheric pressure and successively decreasing temperature to boil at a lower temperature with self-evaporation, concentration of mother liquor and growth of crystals, the pressure differences between successive compartments increasing to the delivery end of the last compartment.

3. The process for crystallizing sugar solutions in a continuous operation, consisting in saturating the solution at a constant temperature of 100° C. supplying seed grains to the flow of the solution while mixing the same and passing said saturated solution mass loaded with seed grains through a series of successive overflow connected compartments at a minus pressure successively decreasing below atmospheric pressure and successively decreasing temperature to boil at a lower temperature with self-evaporation, concentration of mother liquor and growth of crystals, the pressure differences between successive compartments increasing to the delivery end of the last compartment.

GERBERTUS H. DE VRIES.

REFERENCES CITED

The following references are of record in the file of this patent:

UNITED STATES PATENTS

| Number | Name | Date |
|---|---|---|
| 2,160,533 | Bonath | May 30, 1939 |
| 2,210,514 | Thomsen | Aug. 6, 1940 |
| 2,263,704 | Platte et al. | Nov. 25, 1941 |

OTHER REFERENCES

Bardoff and Ball, The Elements of Sugar Refining, Easton, Pennsylvania, 1925, page 110.